United States Patent
Petzold

(12) 
(10) Patent No.: US 6,577,935 B1
(45) Date of Patent: Jun. 10, 2003

(54) EMERGENCY DRIVING DEVICE FOR MOTOR VEHICLES

(75) Inventor: Rainer Petzold, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 09/937,641
(22) PCT Filed: Apr. 22, 2000
(86) PCT No.: PCT/EP00/03655
§ 371 (c)(1),
(2), (4) Date: Sep. 27, 2001
(87) PCT Pub. No.: WO00/66917
PCT Pub. Date: Nov. 9, 2000

(30) Foreign Application Priority Data

Apr. 29, 1999 (DE) .......................................... 199 19 537

(51) Int. Cl.$^7$ ................................................ G06F 7/00
(52) U.S. Cl. ............................ 701/29; 701/33; 701/36; 701/51
(58) Field of Search .............................. 701/48, 51, 52, 701/62, 29, 31, 33, 34, 36

(56) References Cited

U.S. PATENT DOCUMENTS 5,676,620 A   10/1997   Ulm et al. ................... 477/115
5,790,969 A    8/1998   McKee ........................ 701/51

FOREIGN PATENT DOCUMENTS

| DE | 39 40 590 A1 | 6/1990 | .......... F16H/61/00 |
| DE | 42 01 577 A1 | 7/1993 | .......... F16H/59/02 |
| DE | 44 31 073 A1 | 3/1996 | .......... F16H/61/12 |
| DE | 44 41 896 A1 | 5/1996 | .......... B60K/41/04 |
| EP | 0 380 214 A2 | 8/1990 | .......... F16H/59/04 |
| EP | 0 431 538 B1 | 12/1990 | .......... F16H/61/12 |
| FR | 2 678 996 | 1/1993 | .......... F16H/59/12 |
| JP | 11006559 | 1/1999 | .......... F16H/61/02 |

OTHER PUBLICATIONS

Rösch, Rudolf and Gerhard Wagner, "Die elektronische Steuerung des automatischen Getriebes W5A 330/580 von Mercedes–Benz", *ATZ Automobiltechnische Zeitschrift* 97 (1995) pp. 736–748.

*Primary Examiner*—William A. Cuchlinski, Jr.
*Assistant Examiner*—Edward Pipala
(74) *Attorney, Agent, or Firm*—Davis & Bujold, P.L.L.C.

(57) ABSTRACT

The invention concerns and emergency driving device (1) for motor vehicles with an automatic shift transmission, which has integrated in said transmission an electronic control unit (2), which, via at least one CAN-bus (7, 8) is connected with further electronic control units (3, 4, 5, 6) with which the control unit (2) exchanges measurement and regulation data. It is proposed, that the electronic transmission control unit (2) be connected to an auxiliary electronic service panel (13). Thereby, upon a fault of a CAN-bus organ interface thereof, the transmission can be shifted through all gear ratio stages.

6 Claims, 2 Drawing Sheets

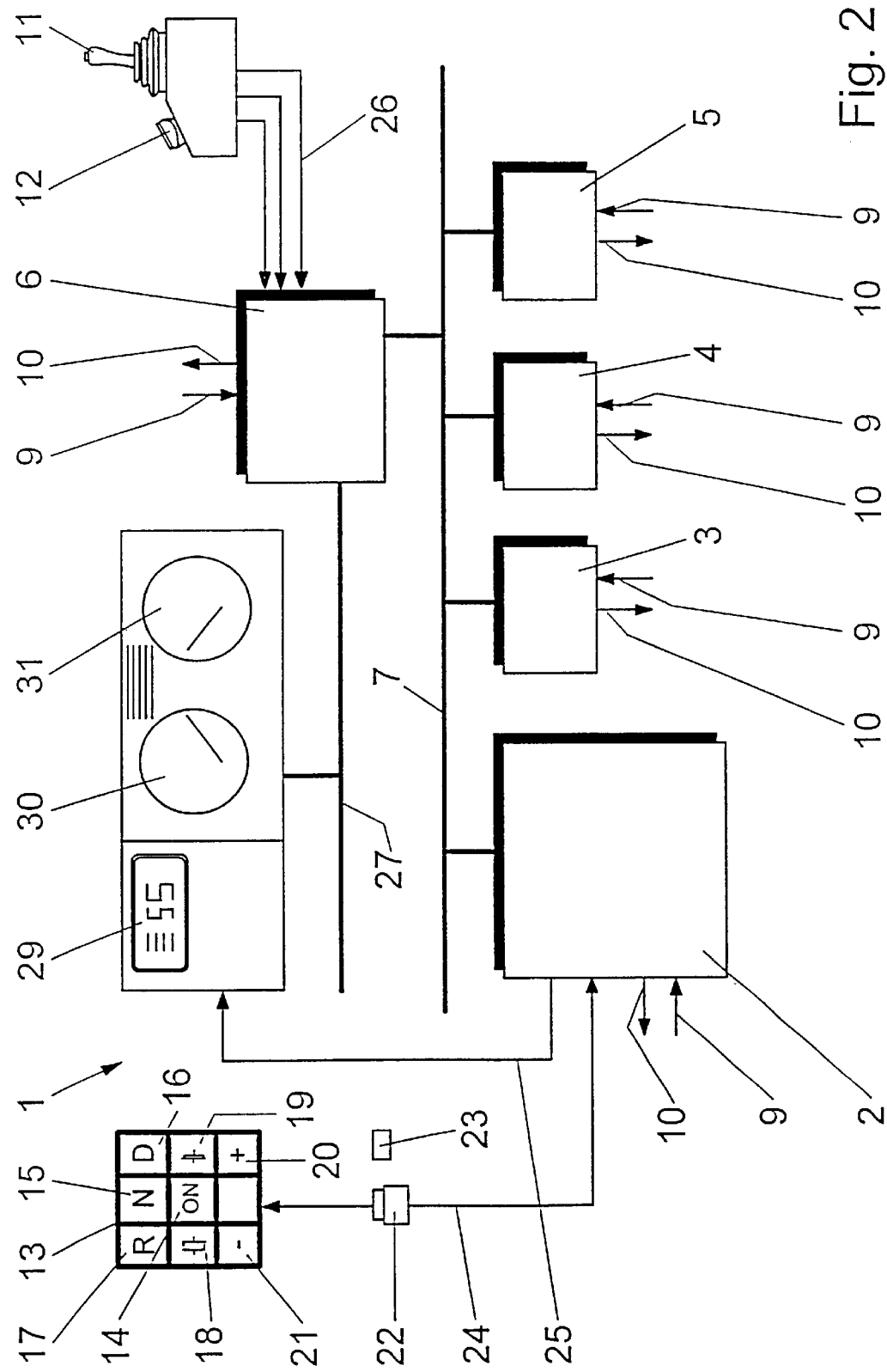

under load or shift with interruption of traction. An electronic control unit is assigned to such transmissions, which
EMERGENCY DRIVING DEVICE FOR MOTOR VEHICLES

FIELD OF THE INVENTION

The invention concerns an emergency driving device for motor vehicles.

BACKGROUND OF THE INVENTION

Automatically shifting transmissions are being installed in motor vehicles to an ever increasing extent. Such transmissions include transmissions with stepless, changeable gear ratios, or transmission with stages, which shift under load or shift with interruption of traction. An electronic control unit is assigned to such transmissions, which chooses and activates an appropriate gear change. This choice is made with dependency on parameters of available power, driving mode, and transmission characteristics. Additionally, the driver can optionally choose one ratio change or a group of ratio changes by the use of a selector lever and/or a program switch.

The control and regulation of the transmission is dependent on and is influenced by the control of additional systems of the vehicle, namely an engine, a service brake or a retarder brake system. These systems possess, as a rule, their own electronic control units, which units, by means of data busses, communicate with one another and with the electronic transmission control unit. The interconnection of such data busses is designated a Controller Area Network (hereinafter called "CAN" busses).

In case the transmission control drops out, because of a defect in the electronics, as a rule, emergency devices are provided with which it becomes possible to drive the vehicle away from the roadway with a limited operational capability, or even to drive the vehicle to the next repair station. Such an defect can, among other things, occur in the failure of a CAN-bus or its interface.

EP 0 431 538 B1 discloses an emergency device, by which, in case of failure, a certain specified ratio stage can be brought into action by means of a special solenoid valve. The valve is activated manually by means of a screw, whereby certain logical circuitry of the normal transmission in the central control unit is deactivated during the emergency switching.

EP 0 380 214 A2 makes known an additional emergency driving apparatus, which gives the driver the ability, if the usual electronic control unit, or the distribution cable has faulted, thus bringing about a case of emergency, to select a forward or a reverse direction gear ratio from the normally available gear ratios. The presupposition in this case, is, of course, that the shifting actuator can still function.

The road load, in the case of the known emergency driving devices, is very limited, since for the forward and reverse movement, respectively, only one gear is available, and the shift must be into this, as a rule in a stillstand of the vehicle.

Thus the purpose of the invention, is to enable driving to be continued and allowing shifting into a multiplicity of gears upon faulting of a CAN-bus or its corresponding interface.

SUMMARY OF THE INVENTION

In accord with the invention, the transmission control unit is connected to a service panel. In case of a defect in the selector lever, or its signal lines to the electronic control unit, such as the connections and CAN-bus, the control of the transmission can be carried out manually on the service panel. If the service panel is activated, then the interface of the selector lever at the electronic control unit is interrupted. This interruption continues as long as the service panel is activated. It is, however, also possible, in order to avoid a conflict of control, not to activate the service panel until the control unit of the transmission signals a corresponding failure.

The service panel possesses, advantageously, the necessary switching functions for the gear shifting, these functions being on/off, neutral, forwards, reverse, clutch in, clutch out, shift up, and shift down. With the aid of such a service panel, all available gears can be shifted through, even though this requires increased attention on the part of the driver. By this means, it becomes possible to continue travel even to a distant service station or to complete a homeward travel out of a foreign country.

There exist, fundamentally, two possibilities for connecting the transmission control unit, which is integral with the transmission, to control units of other systems of the vehicle. This is accomplished by a separate, transmission-specific CAN-bus, which is to be provided in addition to the vehicle-specific CAN-bus. Another way of accomplishing the same thing is by a single, common, vehicle-specific CAN-bus, which coacts with a central electronic control unit. If only the transmission-specific CAN-bus fails, the transmission control unit can be regulated by the said service panel and the shifting will operate in its normal automatic manner. However, if the vehicle-specific CAN-bus drops out, then the shifting can be made only manually by means of the service panel. For this purpose, the service panel possesses a number of shifting functions, which the driver can activate. In doing this, the driver makes use of, in the normal way, the information of a display apparatus which will show the state of the shift in the transmission, along with the engine RPM and a speedometer.

The service panel can be continually connected with the transmission control unit. In order to assure the panel's availability and capability to function in case of an emergency, it is advantageous, to connect this in a releasable manner with the said control unit. If this is done, then in a normal situation, the service panel can be removed and protectively guarded in a safe place in the vehicle and made use of only in a case of need. In an advantageous manner, the service panel should be protected against dust and dampness by sealing in a foil. Storage would be preferred with the maintenance materials or the emergency tools of the vehicle.

So that the connection for the service panel can be checked by a regular diagnostic examination, it is advantageous to provide the service panel with a removable adapter, as long as the service panel is not included.

BRIEF DESCRIPTION OF THE DRAWINGS

Further advantages are to be found in the following description with the aid of the drawing. In the drawing, examples of embodiments of the invention are presented. The description and the claims contain many features in combination. The expert can, however, examine the features individually and combine them to advantageous further combinations. There is shown in:

FIG. 2 a variant of FIG. 1.

DETAILED DESCRIPTION OF THE INVENTION

Figure 1:
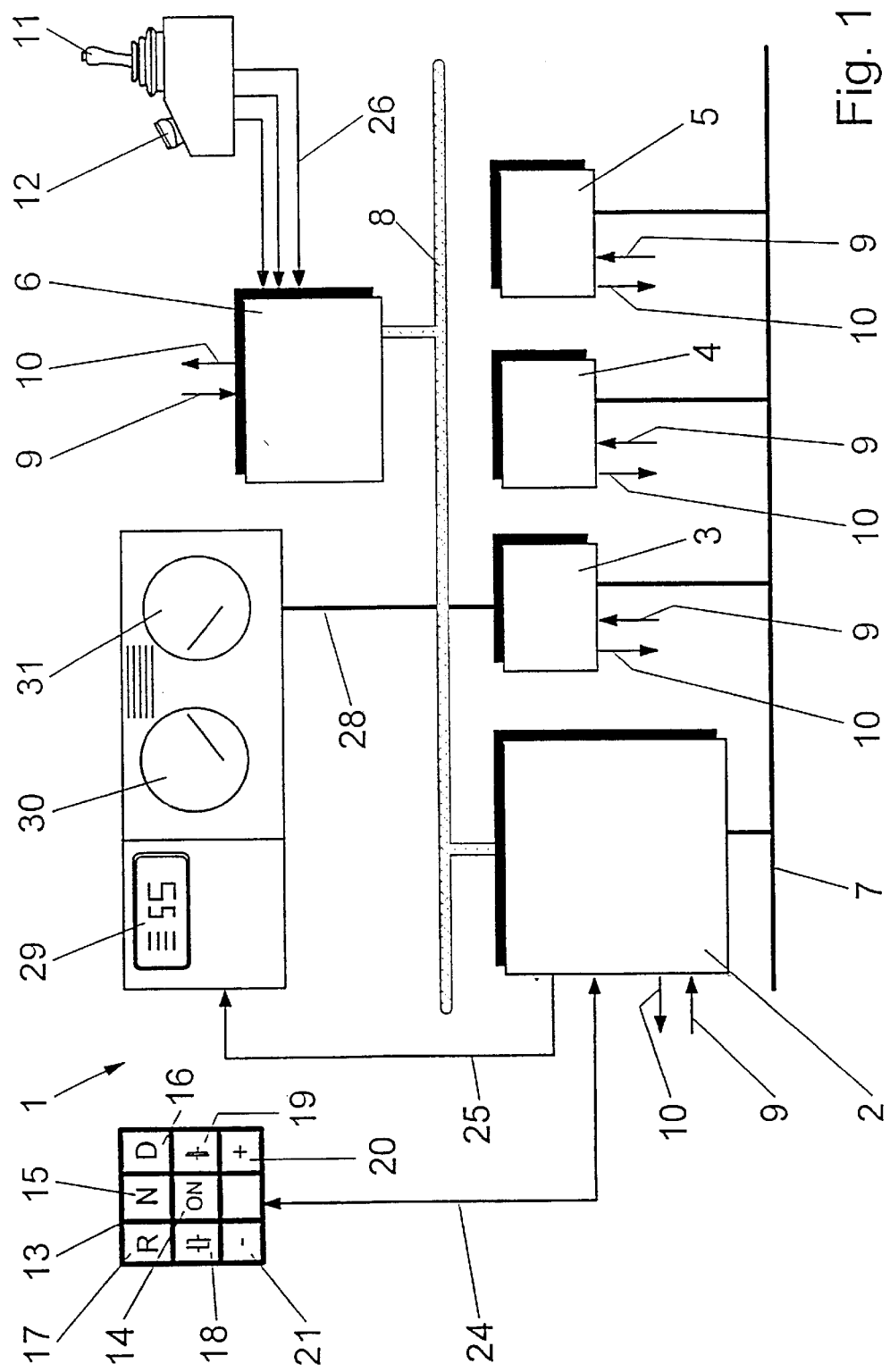
FIG. 1 a schematic construction of an emergency driving device in accord with the invention.

The emergency driving device 1 for an automatically controlled transmission, encompasses essentially an electronic transmission control unit 2 and an auxiliary service panel 13, which, over a signal line 24 is connected to the control unit 2. This control, in accord with FIG. 1, first; is connected by means of a transmission-specific CAN-bus 8 to a control unit 6. Control unit 6, second, is connected through signal lines with a selector lever 11 and a program switch 12. Another vehicle-specific CAN-bus 7 connects the control unit 2 to an electronic control unit 3 for a drive machine, which is not described in any further detail, a control unit 4 for service brakes, which are not described in any further detail, and a control unit 5 for a retarding braking system. The control units 2, 3, 4, 5, 6 exchange data for the regulation of those systems assigned to said controls through the CAN-buses 7 and 8. The control units 2, 3, 4, 5, 6 further possess inputs 9 for regulation and control parameters and outputs 10 to actuators or the like.

Should the transmission-specific CAN-bus 8, or one of its interfaces, or the signal lines 26 or selection lever 11 fail, then the control unit 2 can be activated by the service panel 13. In the case of an activated service panel 13, the gear shifting signals through the interface of the CAN-bus 8 at the control unit 2 are blocked, so that only the control which is generated through the service panel 13 is in force. The service panel 13 possesses a switch action for activating and deactivating (on/off), a switch function 15 for control of the neutral gear position, switch positions 16 and 17 for forward and reverse travel, switch functions 20, 21 for, respectively, shifting up one gear, shifting down one gear. In addition to these are switching positions 18 and 19, for the opening and closing of a (not shown) main clutch. The current shift position of the transmission is shown on a display device 29 by a signal line 25.

Should the CAN-bus 7, or its interface to the control unit 2 drop out, the driver can shift the transmission by means of the service panel 13 in the manner of a normal shift transmission. The torque and the engine RPM influence during shifting is regulated by the driver with the gas pedal. Upon the activation of the buttons 20 or 21, first the main clutch is opened and the gear is released. Upon shifting up, the driver waits just so long, until the engine RPM corresponds to the desired gear and the speed of the vehicle being represented on the speedometer 31. The engine RPM is shown by a speed of rotation meter 30, which is connected by means of a signal line 28 with the control unit 3 for the engine. When the desired RPM of the engine is reached, and the driver releases the currently activated button, then the desired gear is shifts in and the main clutch closes. Upon shifting down, the engine RPM and the corresponding travel speed are matched to the desired gear ratio stage, as the engine is accelerated by increasing the feed of fuel.

The embodiment in accord with FIG. 2, differs from the embodiment depicted on FIG. 1, chiefly in that the transmission-specific CAN-bus is omitted and all control units 2, 3, 4, 5, 6 are bundled together over a common CAN-bus 7. The control unit 6 takes over, as the central control unit, the duties of a coordinating function. In case of a disturbance of the CAN-bus 7, the service panel 13 can regulate the control unit 2, as a normal shifting transmission. The engine RPM meter 30, in this case, is connected by a signal line 27 with the control unit 6.

The embodiment in accord with FIG. 2 shows further, a plug 22, so that the service panel 13 can be separated from the transmission control unit 2. The service panel 13 can then be protected in a sealed foil in a safe place on the vehicle, for example with the maintenance equipment or with the emergency tools. If the service panel 13 is not connected, then an adapter 23 is connected with plug 22.

Thereby, upon a diagnosis of the electronic system, the functional capability of the connection line and the connection itself can be tested, so that in case of emergency, they will be found to be functional. The transmission control unit 2, advantageously, is installed directly on the transmission or is integrated into the hydraulic or pneumatic control of the transmission. Thereby, a failure prone connection between the electronic and the hydraulic/pneumatic control elements is avoided.

In the case of the conventional emergency shifting concepts, i.e. emergency driving methods up to this time, the normal functionality in the control equipment inclusive of the fault-reactions is not made use of in its full scope. In accord with the invention, the full scope of functionality of the control equipment is made use of and only in the case of the failure of interfaces, are substitute functions employed.

Reference Numbers

1 emergency driving device
2 control unit (transmission)
3 control unit (motor)
4 control unit (service brakes)
5 control unit (retarder brakes)
6 control unit (program/lever)
7 can-bus (FIGS. 1, 2)
8 can-bus (FIG. 1)
9 input (I)
10 output (O)
11 selector lever (gear shift lever)
12 program switch
13 service panel
14 on/off button
15 neutral gear button
16 forward button
17 reverse button
18 clutch open
19 clutch closed
20 one up gear
21 one down gear
22 disconnect plug (FIG. 2)
23 adaptor (for test without 13)
24 connecting signal line
25 connecting signal line
26 connecting signal line
27 connecting signal line
28 connecting signal line
29 display of current gear
30 engine rpm indicator
31 speedometer

What is claimed is:

1. An emergency driving device (1) for a motor vehicle with an automatic shift transmission comprising:

an electronic control unit (2) integrally located in the transmission is connected via at least one CAN-bus (7, 8) to additional control units (3, 4 5, 6) and to at least one selector lever (11) for exchanging measurement and transmission regulation data therewith, and an auxiliary electronic service panel (13) having a plurality of switching functions is connected to the electronic control unit to provide transmission control comprising the positions of; on/off (14), neutral (15), forward (16), reverse (17), clutch open (18), clutch closed (19) and shift up one (20) and shift down one (21).

2. The emergency driving device (1) for a motor vehicle according to claim 1, wherein the auxiliary electronic service panel (13) is releasably connectable to the electronic control unit (2) by a plug (22), to which during normal operation, an adapter (23) is affixed to diagnosis the connection between the auxiliary electronic service panel (13) and the electronic control unit (2).

3. The emergency driving device (1) for a motor vehicle according to claim 1, wherein the control unit (2) which is integrated in the transmission is connected by means of a vehicle-specific CAN-bus, (7) having a first control unit (3) for a drive element, a second control unit (4) for a service braking system and a third control unit (5) for a retarding brake system, the control unit (2) is further connected by an exclusive CAN-bus (8) to a fourth control unit (6) of the selector lever (11) for choosing one of a gear stage and a switch (12) for the operational modus of the transmission.

4. The emergency driving device (1) for motor vehicles according to claim 1, wherein the control unit (6) for the selector lever (11), the control unit (3) for the drive machine, the control unit (4) for the service brake system and the control unit (5) for the retarder brake system, are connected by a common CAN-bus (8) with the transmission control unit (2).

5. The emergency driving device (1) for motor vehicles according to claim 1, wherein a connection between the service panel (13) and the electronic control unit is activated, as soon as the transmission control unit (2) determines a fault in the CAN-bus (7, 8).

6. The emergency driving device (1) for motor vehicles according to claim 1, wherein the transmission control unit (2) interrupts signal lines (6, 8) between the selector lever (11) and the said control unit (2), as soon as the service panel (13) is activated.

* * * * *